(12) United States Patent
Shirakawa et al.

(10) Patent No.: US 7,795,375 B2
(45) Date of Patent: Sep. 14, 2010

(54) FLUOROPOLYETHER COMPOUND

(75) Inventors: Daisuke Shirakawa, Yokohama (JP); Kazuya Oharu, Yokohama (JP); Takashi Okazoe, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 1083 days.

(21) Appl. No.: 11/483,566

(22) Filed: Jul. 11, 2006

(65) Prior Publication Data
US 2006/0252910 A1 Nov. 9, 2006

Related U.S. Application Data

(63) Continuation of application No. PCT/JP2005/000256, filed on Jan. 12, 2005.

(30) Foreign Application Priority Data

Jan. 13, 2004 (JP) .............................. 2004-005586

(51) Int. Cl.
*C08G 65/321* (2006.01)
(52) U.S. Cl. ...................... 528/405; 528/401; 528/425; 514/723; 568/677
(58) Field of Classification Search ................... 528/405
See application file for complete search history.

(56) References Cited

U.S. PATENT DOCUMENTS

| 7,501,540 B2 * | 3/2009 | Wang et al. ................. 562/849 |
| 2002/0077451 A1 * | 6/2002 | Sakano et al. ............... 528/392 |
| 2003/0027732 A1 * | 2/2003 | Howell et al. ............... 508/579 |
| 2005/0197408 A1 * | 9/2005 | Shirakawa et al. .......... 514/723 |
| 2006/0030733 A1 * | 2/2006 | Wang et al. ................. 562/849 |

FOREIGN PATENT DOCUMENTS

| JP | 50-104229 | 8/1975 |
| JP | 6-504804 | 6/1994 |
| JP | 7-18083 | 1/1995 |
| JP | 2000-169481 | 6/2000 |
| JP | 3307933 | 5/2002 |
| WO | WO 02/04397 A1 | 1/2002 |
| WO | WO 02/068353 | 9/2002 |
| WO | WO 02/068353 A1 | 9/2002 |
| WO | WO 02/088218 | 11/2002 |
| WO | WO 02/088218 A1 | 11/2002 |
| WO | WO 2004/035656 | 4/2004 |

OTHER PUBLICATIONS

U.S. Appl. No. 11/626,597, filed Jan. 24, 2007, Shirakawa, et al.
Claudio Tonelli, et al., "Linear perfluoropolyether difunctional oligomers: chemistry, properties and applications", Journal of Fluorine Chemistry, vol. 95, 1999, pp. 51-70.
Walton Fong, et al., "Tribo-Chemistry at the Head/Disk Interface", IEEE Transactions on Magnetics, vol. 35, No. 2, Mar. 1999, pp. 911-915.
John Scheirs, "Modern Fluoropolymers", John Wiley & Sons Ltd., 1997, pp. 466-468.
Paul H. Kasai,"Perfluoropolyethers: Intramolecular Disproportionation", Macromolecules, vol. 25, 1992, pp. 6791-6798.
Kyle W. Felling, et al., "Synthesis of perfluorinated functionalized, branched ethers", Journal of Fluorine Chemistry, vol. 125, 2004, pp. 749-754.
U.S. Appl. No. 11/742,863, filed May 1, 2007, Shirakawa, et al.

* cited by examiner

*Primary Examiner*—James Seidleck
*Assistant Examiner*—John J Figueroa
(74) *Attorney, Agent, or Firm*—Oblon, Spivak, McClelland, Maier & Neustadt, L.L.P.

(57) ABSTRACT

It is to provide a compound which has a low vapor pressure and low viscosity, which is less problematic in deterioration during its use and which is useful as e.g. a lubricant, a surface modifier or a surfactant.

A fluoropolyether compound represented by the formula $(X-)_x Y(-Z)_z$, wherein X is a group represented by the formula $HO-(CH_2CH_2O)a.(CH_2CH(OH)CH_2O)_b-(CH_2)_c-CF_2O(CF_2CF_2O)_d-$ (wherein "a" is an integer of from 0 to 100, b is an integer of from 0 to 100, c is an integer of from 1 to 100, and d is an integer of from 1 to 200), Z is a group represented by the formula $R^F O(CF_2CF_2O)_g-$ (wherein $R^F$ is e.g. a $C_{1-20}$ perfluoroalkyl group having an etheric oxygen atom inserted between carbon-carbon atoms, and g is an integer of from 3 to 200), Y is e.g. a (x+z) valent perfluorinated saturated hydrocarbon group, x is an integer of at least 2, z is an integer of at least 0, and (x+z) is an integer of from 3 to 20.

12 Claims, No Drawings

FLUOROPOLYETHER COMPOUND

TECHNICAL FIELD

The present invention relates to a novel fluoropolyether compound useful as e.g. a lubricant, a surface modifier or a surfactant.

BACKGROUND ART

Perfluorinated polyether compounds are widely used as e.g. a lubricant, a surface modifier or a surfactant. For example, as a compound having its terminal group converted to —$CH_2OH$, a compound represented by the following formula (I)(wherein each of h and i is an integer of at least 1) has been known (for example, Non-Patent Document 1):

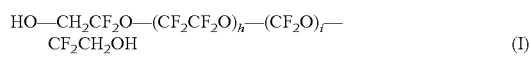

HO—$CH_2CF_2O$—$(CF_2CF_2O)_h$—$(CF_2O)_i$—$CF_2CH_2OH$      (I)

It is known by the document that the surface having a coating film formed by application of the compound (I) on the substrate surface, has a nature (self-replenishing property) such that when a part of the coating film becomes defective, the compound (I) around the defective portion will cover the defective portion to replenish the defective portion. Further, it is known that a —$CH_2OH$ group present at the molecular terminal of the compound (I) is involved in such self-replenishing property.

As a perfluorinated polyether compound such as the compound (I) has become to be used under a high temperature condition, a compound having a lower vapor pressure has been desired. In an attempt to accomplish a low vapor pressure, it has been attempted to increase the molecular weight, but when it is attempted to increase the molecular weight of the compound (I), there has been a problem that the viscosity increases remarkably, whereby its application tends to be difficult. Further, there has been a problem that the proportion of —$CH_2OH$ groups per unit volume becomes low by the increase of the molecular weight, whereby the self-replenishing property tends to deteriorate.

As a compound to solve such problems, a compound represented by the following formula (II) has also been proposed (in the following formula, each of h and i is an integer of at least 1), but also has a problem that the viscosity is high:

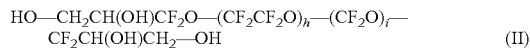

HO—$CH_2CH(OH)CF_2O$—$(CF_2CF_2O)_h$—$(CF_2O)_i$—$CF_2CH(OH)CH_2$—OH      (II)

Further, each of the compound (I) and the compound (II) requires a —$OCF_2O$— unit in its molecular structure. This unit is a unit which causes the decomposition reaction of the compound, and thus the compound having such a unit has had a problem that it undergoes deterioration in its use (e.g. Non-Patent Documents 2, 3 and 4).

As a perfluorinated polyether compound having no —$OCF_2O$— unit, a compound wherein terminals are —COOH groups, has been reported (e.g. Non-Patent Document 5). However, such a compound wherein the terminals are —COOH groups, has had a problem that when left under a high temperature condition, —COOH terminals undergo $CO_2$ removal, whereby polar terminal groups will be lost, and the self-replenishing property will deteriorate. Further, the compound having —COOH groups has had a problem that the acidity of —COOH groups is large, thus causing corrosion.

Non-Patent Document 1: C. Tonelli et al, J. Fluorine Chem., Vol. 95, 1999, p. 51-70

Non-Patent Document 2: W. Fong et al "IEEE Transactions on Magnetics", vol. 35, No. 2, March 1999, p. 911-912

Non-Patent Document 3: J. Scheirs, "Modern Fluoropolymers", John Wiley & Sons Ltd., 1997, p. 466-468

Non-Patent Document 4: P. H. Kasai, "Macromolecules", Vol. 25, 1992, p. 6791

Non-Patent Document 5: Kyle W. Fellling et al, J. Fluorine Chem., Vol. 125, 2004, p. 749-754

DISCLOSURE OF THE INVENTION

Object to be Accomplished by the Invention

The present invention has been made to solve the above problems, and it is an object of the present invention to provide a novel fluoropolyether compound having a low vapor pressure and low viscosity, being excellent in chemical stability and being free from a problem of deterioration in its use. Further, it is an object of the present invention to provide a fluoropolyether compound excellent in self-replenishing property and useful as e.g. a lubricant or a coating agent, and a solvent composition containing the compound.

Means to Accomplishe the Object

The present invention provides the following:

1. A fluoropolyether compound represented by the following formula (A):

$(X—)_xY(—Z)_z$      (A)

wherein symbols have the following meanings:

X: a group represented by the following formula (X) (wherein "a" is an integer of from 0 to 100, b is an integer of from 0 to 100, c is an integer of from 1 to 100, and d is an integer of from 1 to 200):

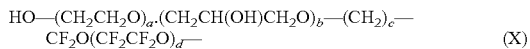

HO—$(CH_2CH_2O)_a$-$(CH_2CH(OH)CH_2O)_b$—$(CH_2)_c$—$CF_2O(CF_2CF_2O)_d$—      (X)

Z: a group represented by the following formula (Z) (wherein $R^F$ is a $C_{1-20}$ perfluoroalkyl group or a group having an etheric oxygen atom inserted between carbon-carbon atoms of such a perfluoroalkyl group (the group has no —$OCF_2O$— structure), and g is an integer of from 3 to 200):

$R^FO(CF_2CF_2O)_g$—      (Z)

Y: a (x+z) valent perfluorinated saturated hydrocarbon group, or a (x+z) valent perfluorinated saturated hydrocarbon group having an etheric oxygen atom inserted between carbon-carbon atoms, having no —$OCF_2O$— structure;

X, Z: X is an integer of at least 2, z is an integer of at least 0, and (x+z) is an integer of from 3 to 20, provided that when x is at least 2, groups represented by the formula (X) may be the same or different, and when z is at least 2, groups represented by the formula (Z) may be the same or different.

2. The compound according to the above 1, wherein the group represented by the formula (X) is any group selected from groups represented by the following formulae (X-1) to (X-4), provided that d is as defined above:

$HOCH_2CF_2O(CF_2CF_2O)_d$—      (X-1)

$HOCH_2CH(OH)CH_2OCH_2CF_2O(CF_2CF_2O)_d$—      (X-2)

$HOCH_2CH_2CF_2O(CF_2CF_2O)_d$—      (X-3)

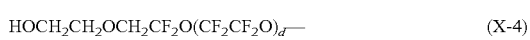

$HOCH_2CH_2OCH_2CF_2O(CF_2CF_2O)_d$—      (X-4)

3. The compound according to the above 2, wherein the compound represented by the formula (A) is a compound represented by the following formula (A-1) or (A-2), provided that $X^{10}$ is any group selected from groups represented by the formulae (X-1) to (X-4), $Y^3$ is a perfluoroalkane-triyl group, and $Y^4$ is a perfluoroalkane-tetrayl group:

$$(X^{10}-)_3Y^3 \quad \quad (A\text{-}1)$$

$$(X^{10}-)_4Y^4 \quad \quad (A\text{-}2)$$

4. The compound according to the above 2, wherein the compound represented by the formula (A) is a compound represented by the following formula (A-3), provided that $X^{10}$ is any group selected from groups represented by the formulae (X-1) to (X-4), $Y^3$ is a perfluoroalkane-triyl group, and Z is as defined above:

$$(X^{10}-)_2Y^3-Z \quad \quad (A\text{-}3)$$

5. The fluoropolyether compound according to any one of the above 1 to 4, wherein the compound represented by the formula (A) has a molecular weight of from 500 to 1,000,000 as measured by gel permeation chromatography and has a molecular weight distribution of from 1.0 to 1.5.

6. A solution composition containing the fluoropolyether compound as defined in any one of the above 1 to 5 and an organic solvent.

7. The solution composition according to the above 6, wherein the concentration of the fluoropolyether compound is from 0.01 to 50 mass %.

8. A lubricant, a surface modifier or a surfactant, which contains the fluoropolyether compound as defined in any one of the above 1 to 5 as an essential component.

Effects of the Invention

According to the present invention, a novel fluoropolyether compound useful as e.g. a lubricant, a surface modifier or a surfactant, is provided. The fluoropolyether compound of the present invention has a low vapor pressure and low viscosity and is less problematic in deterioration during its use. Further, the fluoropolyether compound of the present invention is a compound excellent in self-replenishing property.

BEST MODE FOR CARRYING OUT THE INVENTION

In this specification, a fluoropolyether compound represented by the formula (A) is referred to as the compound (A). Further, a group represented by the formula (X) is referred to as the group (X). With respect to other formulae, reference will be made in the same manner.

The present invention provides the following compound (A). The compound (A) of the present invention has no $-OCF_2O-$ structure:

$$(X-)_xY(-Z)_z \quad \quad (A)$$

In the compound (A), X is a monovalent group represented by the following formula (X):

$$HO-(CH_2CH_2O)_a\text{-}(CH_2CH(OH)CH_2O)_b-(CH_2)_x CF_2-O(CF_2CF_2O)_d- \quad \quad (X)$$

Here, "a" represents the number of $-(CH_2CH_2O)-$ units and is an integer of from 0 to 100, preferably an integer of from 0 to 10, particularly preferably from 0 to 2, especially preferably 0 or 1.

b represents the number of $-(CH_2CH(OH)CH_2O)-$ units and is an integer of from 0 to 100, preferably an integer of from 0 to 10, particularly preferably from 0 to 2, especially preferably 0 or 1.

As a combination of "a" and b, preferred is a case s where each of "a" and b is 0, a case where "a" is 0 and b is at least 1 (b is preferably 1), or a case where "a" is at least 1 ("a" is preferably 1) and b is 0.

c represents the number of $-(CH_2)-$ units and is an integer of from 1 to 100, preferably an integer of from 1 to 10, particularly preferably 1 or 2. In a case where c is at least 2, c is preferably an even number from the viewpoint of the production efficiency.

d represents the number of $-(CF_2CF_2O)-$ units and is an integer of from 1 to 200, preferably an integer of from 3 to 100, particularly preferably an integer of from 3 to 200, especially preferably an integer of from 3 to 70, and further preferably an integer of from 5 to 50. Any one of a, b and c being 0 means that no such units are present.

In the formula (X), preferred is a group (X) wherein "a" is 0, b is 0, c is 1 and d is from 3 to 200, or a group (X) wherein one of "a" and b is at least 1 and the other is 0, c is 1 and d is from 3 to 200.

The notation of the "$-(CH_2CH_2O)_a\text{-}(CH_2CH(OH)CH_2O)_b-$" moiety in the formula (X) means that when at least one unit is present with respect to each of the $-(CH_2CH_2)O-$ unit and the $-(CH_2CH(OH)CH_2O)-$ unit, their arrangement is not particularly limited. Namely, in a case where one unit is present with respect to each of the $-(CH_2CH_2O)-$ unit and the $-(CH_2CH(OH)CH_2O)-$ unit, the unit which is bonded to the hydroxyl group may be the $-(CH_2CH_2O)-$ unit or the $-(CH_2CH(OH)CH_2O)-$ unit.

Further, in a case where both the $-(CH_2CH_2O)-$ unit and the $-(CH_2CH(OH)CH_2O)-$ unit are present, and at least either unit is present in a plurality i.e. at least two units, the arrangement of such units may be in a block form or in a random form, preferably in a block form, more preferably in a block form in the order of the respective units as identified in the formula (X) from the hydroxyl end group.

The following examples may be mentioned for the group (X), provided that d is as defined above:

$$HOCH_2CF_2O(CF_2CF_2O)_d- \quad \quad (X\text{-}1)$$

$$HOCH_2CH(OH)CH_2OCH_2CF_2O(CF_2CF_2O)_d- \quad \quad (X\text{-}2)$$

$$HOCH_2CH_2CF_2O(CF_2CF_2O)_d- \quad \quad (X\text{-}3)$$

$$HOCH_2CH_2OCH_2CF_2O(CF_2CF_2O)_d- \quad \quad (X\text{-}4)$$

Among them, the group (X) is preferably the group (X-1) or (X-2) in view of production efficiency and in that the compound is less likely to be decomposed and is stable.

In the formula (A), Z is a monovalent group of the following formula (Z):

$$R^F-O-(-CF_2CF_2O)_g- \quad \quad (Z)$$

Here, RF is a $C_{1-20}$ perfluoroalkyl group or a group having an etheric oxygen atom inserted between carbon-carbon atoms of such a perfluoroalkyl group (provided that the group has no $-OCF_2O-$ unit). The structure of RF may be a linear structure, a branched structure, a cyclic structure or a structure partially having a cyclic structure, preferably a linear structure or a branched structure, more preferably a linear structure. $R^F$ has preferably from 1 to 20, particularly preferably from 1 to 16 carbon atoms.

The following groups may be mentioned as specific examples for $R^F$, and preferred is a group ($R^{F1}$). In the following formulae, s is an integer of from 0 to 15, $C_y^F$ is a perfluorocyclohexyl group, t is an integer of from 0 to 15, $A_d^F$ is a perfluorinated adamantyl group, and t is an integer of from 0 to 15:

$$CF_3(CF_2)_s-(R^{F1})$$

$$C_{y'}^F(CF_2)_t-$$

$$A_d^F(CF_2)_t-$$

g is the number of —(CF$_2$CF$_2$O)— units and is an integer of from 3 to 200, preferably an integer of from 3 to 100, more preferably an integer of from 3 to 70, particularly preferably an integer of from 5 to 50.

The following examples may be mentioned as the group (Z):

$$CF_3-O-(CF_2CF_2O)_g- \quad (Z\text{-}1)$$

$$CF_3(CF_2)_2-O-(CF_2CF_2O)_g- \quad (Z\text{-}2)$$

$$CF_3(CF_2)_5-O-(CF_2CF_2O)_g- \quad (Z\text{-}3)$$

The compound (A) is a compound having x monovalent groups (X) and z monovalent groups (Y) bonded to Y, and Y is a (x+z) valent group.

(x+z) which is the valency of Y, is an integer of at least 3, preferably an integer of from 3 to 20, particularly preferably an integer of from 3 to 10. The value (x+z) is preferably suitably adjusted depending upon the purpose of use of the compound (A), and in a case where the compound (A) is used as a lubricant as described hereinafter, (x+z) is preferably an integer of from 3 to 10, especially preferably 3 or 4, further preferably 3. A compound wherein the valency of Y is 3 or 4 (particularly 3) tends to be easily produced, have a suitable boiling point and be excellent in self-replenishing property.

(x) corresponding to the number of the groups (X) is an integer of at least 2, preferably an integer of from 3 to 20, particularly preferably an integer of from 3 to 10, especially preferably 3 or 4. (z) corresponding to the number of groups (Z) is an integer of at least 0, z is preferably an integer of from 0 to 17, particularly preferably an integer of from 0 to 7, especially preferably 0 (i.e. no group (Z) is present) or 1. In a case where x is at least 2, the groups (X) may be the same or different, and in a case where z is at least 2, the groups (Z) may be the same or different.

Y has preferably from 1 to 50, particularly preferably from 1 to 20, especially preferably from 3 to 5, carbon atoms. In a case where Y is a (x+z) valent perfluorinated saturated hydrocarbon group, the group is a (x+z) valent saturated group composed solely of carbon atoms and fluorine atoms. In a case where Y is a group containing an etheric oxygen atom, the number of the etheric oxygen atom is 1 or more, preferably from 1 to 3. Since the etheric oxygen atom is present between carbon-carbon atoms, no etheric oxygen atom is present at terminal moieties of Y bonded to X and Z. Further, since the compound (A) has no —OCF$_2$O— structure, Y has no —OCF$_2$O— structure. Further, the etheric oxygen atom in Y is not bonded to the carbon atom at the bond terminal. Y is preferably a (x+z) valent perfluorinated saturated hydrocarbon group containing no etheric oxygen atom. A trivalent group (Y) is particularly preferably a perfluoroalkane-triyl group, and a tetravalent group (Y) is particularly preferably a perfluoroalkane-tetrayl group. Such groups having from 1 to 20 carbon atoms are especially preferred, and such groups having from 3 to 5 carbon atoms are further preferred.

A compound (A) wherein no Z is present and the group (Y) is a trivalent group (Y$^3$), is preferably the following compound (A-1). In the following formula, X$^{10}$ is any group selected from groups (X-1) to (X-4), and Y$^3$ is a perfluoroalkane-triyl group:

$$(X^{10}-)_3Y^3 \quad (A\text{-}1)$$

The compound (A-1) is preferably the following compounds wherein X$^{10}$ is the group (X-1) or (X-2):

$$(HOCH_2CF_2O(CF_2CF_2O)_d-)_3Y^3 \quad (A\text{-}11)$$

$$(HOCH_2CH(OH)CH_2OCH_2CF_2O(CF_2CF_2O)_d-)_3Y^3 \quad (A\text{-}12)$$

A compound (A) wherein no Z is present and the group (Y) is a tetravalent group (Y$^4$), is preferably the following compound (A-2). In the following formula, X$^{10}$ is any group selected from groups (X-1) to (X-4), and Y$^4$ is a perfluoroalkane-tetrayl group:

$$(X^{10}-)_4Y^4 \quad (A\text{-}2)$$

The compound (A-2) is preferably the following compound (A-21) or (A-22) wherein X$^{10}$ is the group (X-1) or (X-2):

$$(HOCH_2CF_2O(CF_2CF_2O)_d-)_4Y^4 \quad (A\text{-}21)$$

$$(HOCH_2CH(OH)CH_2OCH_2CF_2O(CF_2CF_2O)_d-)_4Y^4 \quad (A\text{-}22)$$

In a case where Z is present, preferred is the following compound (A-3) wherein the group (Y) is a trivalent group (Y$^3$). In the following formula, X$^{10}$ is any group selected from groups represented by the formulae (X-1) to (X-4), Y$^3$ is a perfluoroalkane-triyl group and Z is a group represented by the formula (Z):

$$(X^{10}-)_2Y^3-Z \quad (A\text{-}3)$$

The compound (A-3) is preferably the following compound (A-31) or (A-32) wherein X$^{10}$ is the group (X-1) or (X-2):

$$(HOCH_2CF_2O(CF_2CF_2O)_d-)_2Y^3-Z \quad (A\text{-}31)$$

$$(HOCH_2CH(OH)CH_2OCH_2CF_2O(CF_2CF_2O)_d-)_2 \\ Y^3-Z \quad (A\text{-}32)$$

In the above formulae, as Y$^3$ (perfluoroalkane-triyl group), the following groups may be mentioned:

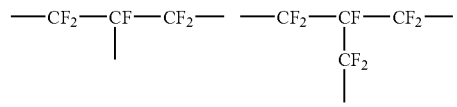

As Y$^4$ (perfluoroalkane-tetrayl group), the following group may be mentioned:

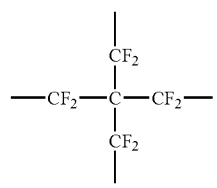

Examples for the group (Y) other than the above are shown in examples for the compound (A).

The compound (A) may be present as a single compound or a combination of at least two types of compounds. As an example for the latter, a composition comprising two or more compounds differing in the group (X) and/or the group (Z) present in the compound (A), may be mentioned.

In a case where the compound (A) is a composition comprising two or more different types of the compound (A), the average of "a" in the group (X) is preferably a positive number of from 0 to 2, particularly preferably 0. The average of b is preferably a positive number of from 0 to 2. The average of c is preferably 1. The average of d is preferably a positive number of from 3 to 100. The average of g is preferably a positive number of from 3 to 100.

The molecular weight of the compound (A) is preferably from 500 to 100,000, more preferably from 1,000 to 20,000. Further, in a case where the compound (A) is a mixture of at least two types of compound, the molecular weight distribution ($M_w/M_n$) of the compound (A) is preferably from 1.0 to 1.5, more preferably from 1.0 to 1.25. When the molecular weight and the molecular weight distribution are within the above ranges, such advantages will be obtained as a low viscosity, a small amount of evaporative components and uniformity when dissolved in a solvent. The molecular weight and the molecular weight distribution of the compound (A) can be measured by gel permeation chromatography, and as the measuring conditions, the conditions disclosed in Examples given hereinafter may be employed.

The following compounds may be mentioned as specific examples for the compound (A) in the present invention. Here, in the following formulae, X and Z are as defined above, and k is an integer of from 1 to 10, provided that in a case where two or more k are present in the same molecule, they may be the same or different from one another:

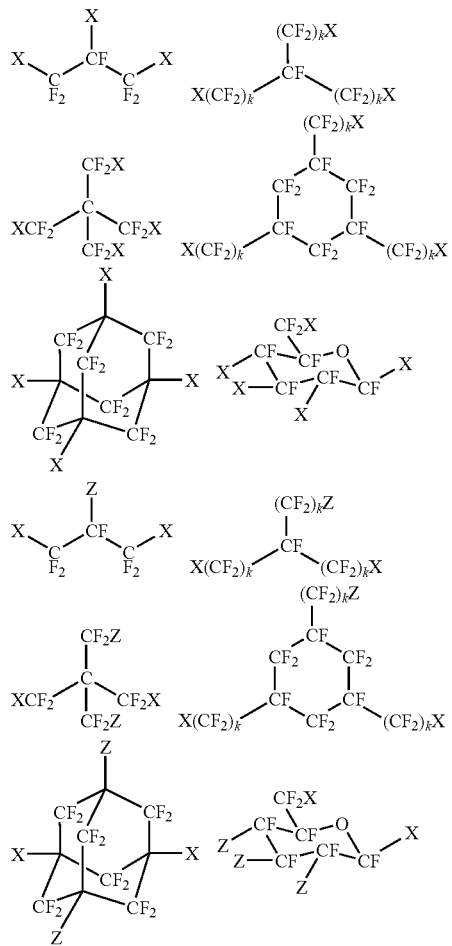

In the compound (A) of the present invention, a unit represented by —(OCF$_2$O)— is not present. A compound having no —(OCF$_2$O)— unit, is a compound such that the unit cannot be detected by a usual analytical method (such as $^{19}$F-NMR).

The compound (A) of the present invention may be produced by the same method as the method disclosed in WO02/4397 by the present inventors or the like from a hydro-polyethylene glycol having a carbon backbone corresponding to the compound (A). As the hydro-polyethylene glycol which may be used as the raw material, ones having various structures or molecular weights are commercially available inexpensively and readily. Otherwise, it can easily be synthesized by adding ethylene oxide to a polyhydric alcohol.

Specifically, a compound of the formula (A) wherein c is 1 can be produced by the following method.

Here, in the following formulae, symbols are as defined above. $Y^H$ is the same group as Y or a group having some or all of fluorine atoms in Y substituted by hydrogen atoms. R is the same group as $R^F$, or a group having some or all of fluorine atoms in $R^F$ substituted by hydrogen atoms, preferably the same group as $R^F$. $R^b$ is a monovalent fluorinated organic group, preferably a perfluoroalkyl group or a perfluoroalkyl group containing an etheric oxygen atom (the group has no —OCF$_2$O— unit). $R^{bF}$ is a monovalent perfluorinated organic group, preferably the same perfluoroalkyl group as $R^b$, or the same perfluoroalkyl group containing an etheric oxygen atom as $R^b$. $R^c$ is an alkyl group. $X^1$ is a chlorine atom or a fluorine atom.

Namely, the following compound (D1) is reacted with the following compound (D2) to obtain the following compound (D3), and the compound (D3) is perfluorinated to obtain the following compound (D4). In the compound (D4), the ester bond is subjected to a decomposition reaction to obtain the following compound (D5). Then, the compound (D5) is reacted with the following compound (D6) to obtain the following compound (D7), or the compound (D5) is hydrolyzed to obtain the following compound (D8). Then, the compound (D7) is subjected to reduction and a decomposition reaction of the ester bond, or the compound (D8) is reduced, to obtain the following compound (A-4). Otherwise, the compound (D7) can also be obtained by subjecting the compound (D4) and a compound of the formula $R^c$—OH (wherein $R^c$ is as defined above) to an ester exchange reaction. Such compound (A-4) is a compound of the formula (A) wherein c is 1 and each of "a" and b is 0.

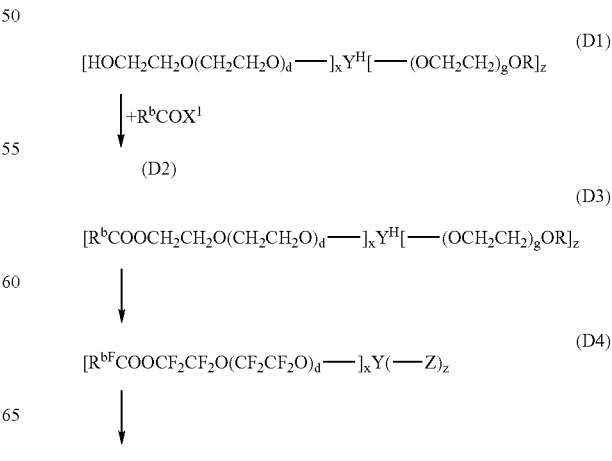

-continued

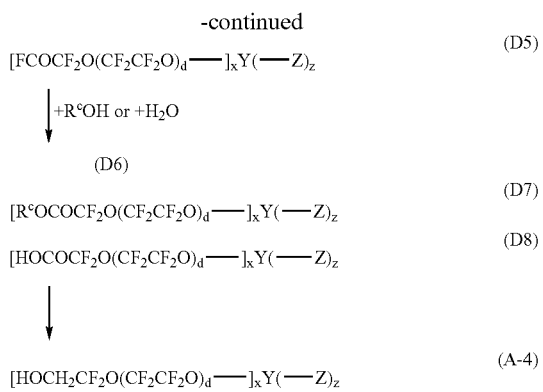

The following compound (A-5) which corresponds to the compound (A) wherein c is at least 2, and each of "a" and b is 0, can be produced by the following method. Namely, the compound (D5) in the above method, is reacted with iodine ($I_2$) or LiI to convert the terminal —COF group to —I (iodine atom), thereby to obtain a compound (D9). Then, an optional molar amount of ethylene is addition-reacted to the compound (D9) to obtain a compound (D10). Then, the terminal iodine atom in the compound (D10) is alcohol-modified by fumed sulfuric acid or betaine to obtain the compound (A-5).

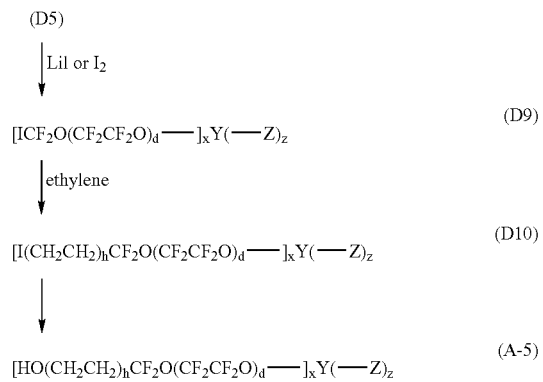

The compound (A) wherein "a" is at least 1, can be obtained by adding ethylene carbonate and/or ethylene oxide to the compound (A-4) or the compound (A-5) obtained by the above-mentioned method. Further, the compound (1) wherein b is at least 1 can be obtained by adding glycidyl alcohol to the compound (A-4) or the compound (A-5).

The addition reaction of ethylene carbonate and/or ethylene oxide can be carried out in accordance with known methods and conditions. Here, in a case where the fluorine content in the compound (A-4) or the compound (A-5) is high, compatibility with ethylene carbonate and/or ethylene oxide to be used for the addition reaction, is low, whereby the reaction system for the addition reaction may undergo phase separation into two phases. If such phase separation takes place, the reaction time will be long, such being not efficient, and it is preferred to carry out the reaction by adding a solvent to increase the compatibility to the reaction system. As such a solvent, a hydrofluorocarbon (HCFC) may be mentioned.

As the compound (D1) being a starting material for the production method, one which is a mixture of at least two types differing in the number of —($CH_2CH_2O$)— units, is usually readily available. In a case where the above production method is carried out by using the compound (D1) as such a mixture, the compound (A) which will be formed, will also be a mixture.

The respective reaction steps in the method for producing the compound (A) can be carried out in accordance with the methods and conditions in known reactions (for example, the method disclosed in WO02/4397). Further, the reaction steps from the compound (D5) to the compound (D7) and the compound (D8) can also be carried out in accordance with known methods. For example, the reduction step in the production of the compound (D7) and the compound (D8) can be carried out in accordance with the method disclosed in e.g. JP-A-10-72568 (paragraph 0021). Such a reduction step is preferably carried out by using a reducing agent such as $NaBH_4$, borane-THF or lithium aluminum hydride.

The product containing the compound (A) obtained by the above method is usually preferably subjected to purification treatment depending upon the particular purpose to obtain the compound (A) of high purity, whereupon it is used for the desired application.

It is preferred to remove metal impurities, anion impurities, and reaction by-products (such as by-products differing in the number of hydroxyl groups) contained in the product by purification treatment. As a means for the purification treatment, a known method of removing e.g. metal impurities and anion impurities by an ion absorbing polymer or a method by means of supercritical extraction may be mentioned.

Further, it is industrially advantageous to employ column chromatography for the purification treatment, as e.g. by-products can be efficiently removed. The stationary phase of the column chromatography may, for example, be silica gel, activated alumina, magnesium oxide, aluminum silicate or magnesium silicate (such as Forisil, trade name), and preferred is one having an average diameter of pores less than 200 Å. As a mobile phase, a usual nonpolar solvent or polar solvent may be used, and it is preferred to change the polarity by changing the proportion of such solvents as the case requires. Further, the compound (A) of the present invention is a fluorinated compound and is generally excellent in solubility in a fluorinated solvent, but a fluorinated solvent is not essential for the mobile phase in the column chromatography.

The nonpolar solvent may, for example, be a hydrocarbon solvent such as hexane or octane, or a halogenated hydrocarbon solvent such as R-113 or R-225. The polar solvent may, for example, be an alcohol solvent such as methanol, ethanol or propanol; a halogenated alcohol such as hexafluoroisopropanol; a ketone solvent such as acetone or methyl ethyl ketone; a carboxylic acid solvent such as acetic acid, a nitrile solvent such as acetonitrile; an amide solvent such as dimethylformamide; an ester solvent such as methyl acetate or ethyl acetate; or an alkyl sulfoxide such as dimethyl sulfoxide.

The compound (A) to be obtained by the method of the present invention is a compound useful as a lubricant, a surface modifier or a surfactant. Namely, the present invention provides a lubricant, a surface modifier or a surfactant containing the fluoropolyether compound (A) as an essential component.

The lubricant may be a lubricant to be applied to a diamond-like carbon protective film (DLC film) for magnetic disks. The surface modifier may be used to control the refractive index of a polymer or to improve chemical resistance of a polymer by application on the surface of the polymer.

In a case where the compound (A) is used as a lubricant or a surface modifier, the compound (A) is used preferably as a solution composition. In a case where it is used as the solution composition, the solvent is preferably a perfluoroamine such as perfluorotripropylamine or tributylamine or a perfluoroalkane such as Vertrel (manufactured by DuPont). The concentration of the compound (A) in the solution composition may be suitably adjusted depending upon the purpose of use, and it is preferably from 0.01 to 50 mass %, more preferably from 0.01 to 20 mass %.

The solution composition containing the compound (A) may be any of a solution, a suspension and an emulsion, preferably a solution. Further, the solvent is preferably a solvent having a boiling point appropriate for coating (such as coating in a dip coating step) as described hereinafter. The solution composition may contain a component (hereinafter referred to as another component) other than the compound (A) and the solvent. In a case where the compound (A) is used as a lubricant, another component may, for example, be a radical scavenger (such as X-1p, trade name, manufactured by Dow Chemicals). In a case where the compound (A) is used as a coating material, another component may be a silane, epoxy, titanium, aluminum or another coupling agent, which will improve adhesive properties of the compound (A) to a substrate.

In a case where the compound (A) is used as a lubricant or a surface modifier, it is preferred to develop an aimed function by applying the compound (A) or the solution composition containing the compound (A) to the substrate surface, followed by drying to form a thin membrane of the compound (A).

The coating method may, for example, be roll coating, casting, dip coating, spin coating, water casting, die coating, a Langmuir-Blodgett method, or a vacuum deposition method, and preferably spin coating, dip coating or a vacuum deposition method.

In a case where coating is carried out by spin coating or dip coating, it is preferred to employ a solution composition. For the solution composition, it is preferred to select the solvent suitably considering e.g. handling efficiency, boiling point and availability.

The thin membrane formed by using the compound (A) of the present invention is transparent, has a low refractive index, or is excellent in heat resistance or chemical resistance. Further, the thin membrane has high lubricity and has self-replenishing property. The thickness of the thin membrane is usually preferably from 0.001 to 50 μm. The shape and the material of the substrate are not particularly limited. The substrate coated with the solution composition containing the compound (A) of the present invention may be used for e.g. a hard disk substrate, optical fibers, a mirror, a solar battery, an optical disk, a touch panel, a photoconductor or fuser drum, a film condenser, or a film such as an antireflection film for glass window.

As an example wherein the compound (A) is used as a surfactant, an additive or a leveling agent to decrease the surface tension of a coating or a leveling agent for a polishing liquid. In a case where it is added to a coating, it is preferably added to such an extent that the amount of the compound (A) is from about 0.01 to about 5 mass % to the coating.

The compound (A) is useful also for applications other than the above. In a case where the compound (A) is used for another application, the compound (A) may be used as it is or may be used in the form of e.g. a solution composition. Another application may, for example, be an additive to be added to a wire coating material, an ink repellent (e.g. for coating or for a printer such as an ink jet printer), an adhesive for semiconductor device (such as an adhesive for LOC (lead on chip) tape, a protective coating for semiconductor (such as a moistureproof coating agent or an ascent inhibitor for soldering) or a thin membrane (such as a pellicle membrane) to be used in optical field, a lubricant for an antireflection film for displays and an antireflection film for resists.

When the compound (A) of the present invention is used for these applications, an advantage can be obtained such that performance can be maintained stably over a long period of time.

EXAMPLES

Now, the present invention will be described in further detail with reference to Examples. However, it should be understood that the present invention is by no means thereby restricted.

In the following, tetramethylsilane is represented by TMS, $CCl_2FCClF_2$ by R-113, dichloropentafluoropropane by R-225, and $CClF_2CF_2CCl_2CF_2CF_3$ by R-419.

Further, $M_w$ represents the mass average molecular weight, and $M_n$ represents the number average molecular weight. The average molecular weight means $M_n$, and the molecular weight distribution means $M_w/M_n$.

The molecular weight was measured by gel permeation chromatography (hereinafter referred to as GPC). The measuring method by GPC was carried out in accordance with the method disclosed in JP-A-2001-208736. Specifically, using as a mobile phase a (99:1) solvent mixture of R-225 (Asahiklin AK-225SEC Grade 1, tradename, manufactured by Asahi Glass Company, Limited) and hexafluoroisopropyl alcohol (HFIP), two PLgel MIXED-E columns (tradename, manufactured by Polymer Laboratories Ltd.) were connected in series to constitute a column for analysis. The analysis was carried out by using, as standard samples for measuring the molecular weight, four types of perfluoropolyethers having molecular weights of from 2,000 to 10,000 and $M_w/M_n$ less than 1.1 and one type of perfluoropolyether having a molecular weight of 1,300 and $M_w/M_n$ of at least 1.1. The mobile phase flow rate was set to be 1.0 mL/min, the column temperature was set at 37° C., and as the detector, an evaporation light scattering detector was employed.

TMS was used as a standard substance for $^1$H-NMR (300.4 MHz), and $CFCl_3$ was used as a standard substance for $^{19}$F-NMR (282.7 MHz). R-113 was used as a solvent for NMR, unless otherwise specified.

Example 1

Example for Esterification Reaction

Ethylene oxide is added to a triol represented by the formula $HC(CH_2OH)_3$ by a known method, and then R-225 (50 g) and NaF (2.88 g) are put in a flask, and nitrogen is bubbled with vigorous stirring while the internal temperature is maintained at 25° C. to obtain the following compound (D2-1). $FCOCF(CF_3)OCF_2CF(CF_3)O(CF_2)_3F$ (34.3 g) is dropwise added thereto over a period of 1.0 hour, while the internal temperature is maintained at a level of at most 10° C. After completion of the dropwise addition, the mixture is stirred at room temperature for 24 hours, whereupon a crude liquid is recovered. Further, the crude liquid is subjected to filtration under reduced pressure, and the recovered liquid is dried for 12 hours in a vacuum drier (100° C., 666.5 Pa (absolute pressure)). The crude liquid thereby obtained is dissolved in R-225 (100 mL) and washed three times with a saturated bisodium carbonate solution (1,000 mL) to recover an organic phase.

To the recovered organic phase, magnesium sulfate (1.0 g) is further added, followed by stirring for 12 hours. Then, magnesium sulfate is removed by pressure filtration, and R-225 is distilled off by an evaporator to obtain a polymer (52.8 g) which is liquid at room temperature. As a result of $^1$H-NMR and $^{19}$F-NMR, the obtained polymer is confirmed to be the following compound (D3-1). Here, the average value of (k+r+p) is 27.0. $R^f$ is —$CF(CF_3)OCF_2CF(CF_3)OCF_2CF_2CF_3$. $M_n$ is 2,600, and $M_w/M_n$ is 1.15.

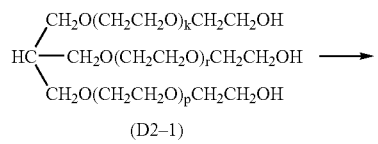

(D2-1)

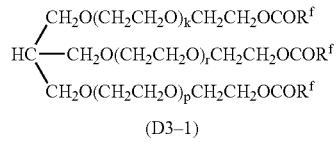

(D3-1)

$^1$H-NMR (solvent: CDCl$_3$) δ (ppm): 3.4 to 3.8, 4.5.
$^{19}$F-NMR (solvent: CDCl$_3$) δ (ppm): −76.0 to −81.0, −81.0 to −82.0, −82.0 to 82.5, −82.5 to −85.0, −128.0 to −129.2, −131.1, −144.7.

Example 2

Example for Fluorination of Compound (D3-1) Obtained in Example 1

Example 2-1

Example Wherein the Solvent for the Reaction is R-113

Into a 500 mL autoclave made of hastelloy, R-113 (312 g) is added, stirred and maintained at 25° C. At the gas outlet of the autoclave, a condenser maintained at 20° C., a NaF pellet-packed layer and a condenser maintained at −20° C. are installed in series. Here, from the condenser maintained at −20° C., a liquid-returning line to return the condensed liquid to the autoclave, is installed. After blowing nitrogen gas for 1.0 hour, fluorine gas diluted to 20 mol % with nitrogen gas (hereinafter referred to as 20% fluorine gas) is blown for one hour at a flow rate of 16.97 L/hr.

Then, while 20% fluorine gas is blown at the same flow rate, a solution having the product (D3-1)(15 g) obtained in Example 1 dissolved in R-113 (200 g), is injected over a period of 11 hours.

Then, 6 mL of a R-113 solution is injected, while 20% fluorine gas is blown at the same flow rate. Further, nitrogen gas is blown for 1.0 hour.

After completion of the reaction, a crude liquid is recovered, and the solvent is distilled off by vacuum drying (60° C., 6.0 hr) to obtain a product (21.4 g) which is liquid at room temperature. As a result of the analysis of the product, it is confirmed to be the following compound (D4-1) having substantially all hydrogen atoms in the compound (D3-1) obtained in Example 1 substituted by fluorine atoms. The proportion of the number of fluorine atoms in the compound (D4-1) to the number of hydrogen atoms in the compound (D3-1), is at least 99.9 mol %. $M_n$ is 4,600, thus (k+r+p) in the following formula is a value whereby $M_n$ becomes 4,600. Further, $M_w/M_n$ is 1.20.

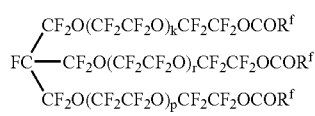

(D4-1)

$^1$H-NMR δ (ppm): 5.9 to 6.4
$^{19}$F-NMR δ (ppm): −77.5 to −86.0, −88.2 to −92.0, −120.0 to −139.0, −142.0 to −146.0, −181.5 to −184.5.

Example 2-2

Example Wherein the Solvent for the Reaction is R-419

A reaction is carried out in the same manner except that R-113 in Example 2-1 is changed to R-419. As a result of the analysis of the formed product, formation of the same compound (D4-1) as the product in Example 2-1, is confirmed.

Example 2-3

Example Wherein the Solvent for the Reaction is $FCOCF(CF_3)OCF_2CF(CF_3)OCF_2CF_2CF_3$ A reaction is carried out in the same manner except that R-113 in Example 2-1 is changed to $FCOCF(CF_3)OCF_2CF(CF_3)OCF_2CF_2CF_3$. As a result of the analysis of the product, formation of the same compound (D4-1) as the product in Example 2-1, is confirmed.

Example 3

Example for Thermal Decomposition of Compound (D4-1) Obtained in Example 2-1

A 50 mL round-bottomed flask containing a stirrer chip is sufficiently flushed with nitrogen. To the round-bottomed flask, 1,1,3,4-tetrachlorohexafluorobutane (25 g), KF (0.20 g) and the compound (D4-1)(20 g) obtained in Example 2-1 are added, vigorously stirred and maintained at 120° C. At the outlet of the round-bottomed flask, a condenser maintained at 20° C. and a dry ice/ethanol cooling tube are installed in series, and nitrogen sealing is carried out.

Eight hours later, the internal temperature is lowered to room temperature, and then, a vacuum pump is connected to the cooling tube, and while the interior is maintained under reduced pressure, the solvent and the reaction by-products are distilled off. Three hours later, a product (13.3 g) which is liquid at room temperature, is obtained.

As a result of the analysis of the product, formation of the following compound (D5-1) is confirmed. The proportion of the number of —COF groups in the product to the total number of ester bonds in the compound (D4-1) is at least 99 mol %.

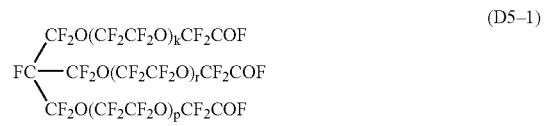

(D5-1)

$^1$H-NMR δ (ppm): 5.9 to 6.4.
$^{19}$F-NMR δ (ppm): 12.7, −78.1, −88.2 to −92.0, −135.0 to −139.0, −181.5 to −184.5.

Example 4

Example for Methyl Esterification of Compound (D5-1) Obtained in Example 3

Example 4-1

Example for Production by Esterification Reaction

Into the round-bottomed flask containing the compound (D5-1) obtained in Example 3, KF (0.9 g) and R-113 (5.0 g)

are put, followed by vigorous stirring while the internal temperature is maintained at 25° C. Further, methanol (0.5 g) is slowly dropwise added while the internal temperature is maintained at 25° C. or higher.

Eight hours later, stirring is stopped, and a crude liquid is filtered by a pressure filtration apparatus to remove KF. Then, by an evaporator, R-113 and excess methanol are completely removed to obtain a product (13.5 g) which is liquid at room temperature.

As a result of the analysis of the product, formation of the following compound (D7-1) is confirmed. All of —COF groups in the compound (D5-1) are found to be methyl-esterified. $M_n$ is 3,200, and $M_w/M_n$ is 1.17.

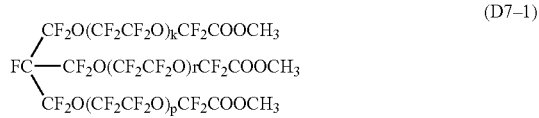

$^1$H-NMR δ (ppm): 3.95, 5.9 to 6.4.
$^{19}$F-NMR δ (ppm): −78.3, −88.2 to −92.0, −135.0 to −139.0, −181.5 to −184.5.

Example 4-2

Example for Production by Ester-exchange Reaction

A 50 mL round-bottomed flask containing a stirrer chip is sufficiently flushed with nitrogen. The compound (D4-1) (20.0 g) obtained in the same manner as in Example 2-1 and methanol (1.0 g) are added, followed by vigorous stirring while bubbling is carried out at room temperature. The outlet of the round-bottomed flask is sealed with nitrogen.

Eight hours later, a vacuum pump is connected to the cooling tube to maintain the interior under reduced pressure, and excess methanol and reaction by-products are distilled off. Three hours later, a product (13.6 g) which is liquid at room temperature, is obtained.

As a result of the analysis of the product, formation of a compound (D7-1) is confirmed. $M_n$ of the product is 3,200. The proportion of the number of —COOCH$_3$ groups in the product to the number of ester bonds in the compound (D4-1) is 99.9 mol %.

$^1$H-NMR δ (ppm): 3.95, 5.9 to 6.4.
$^{19}$F-NMR δ (ppm): −78.3, −88.2 to −92.0, −135.0 to −139.0, −181.5 to −184.5.

Example 5

Example for Conversion of Compound (D7-1) Obtained in Example 4

The compound (D7-1)(13.0 g) obtained by the method in Example 4-2, R-225 (240 mL) and tetrahydrofuran (240 mL) are mixed, and a borane/tetrahydrofuran complex (4.0 g) is added in a nitrogen stream, followed by stirring at room temperature overnight. The solvent is distilled off by an evaporator, and 2 mol/L of hydrochloric acid is added to the residue, followed by extraction with R-225. The extract is concentrated to obtain a crude product (11.95 g). The crude product is purified by a silica gel column (eluent: R-225/ hexafluoroisopropyl alcohol). By $^1$H-NMR and $^{19}$F-NMR, formation of the following compound (A-11a) is confirmed.

Further, it is confirmed that substantially no —(OCF$_2$O)— units are contained in the compound. $M_n$ is 3,000, and $M_w/M_n$ is 1.12.

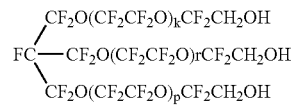

$^1$H-NMR δ (ppm): 3.94.
$^{19}$F-NMR δ (ppm): −80.1, −88.2 to −90.5, −135.0 to −139.0, −181.5 to −184.5.

Example 6

Examples for Ethylene Carbonate Addition Reaction to Copound (A-11a) Obtained in Example 5

The compound (A-11a)(10.0 g) obtained in Example 5, R-419 (10 mL) and ethylene carbonate (1.0 g) are put in a round-bottomed flask (50 mL), followed by stirring. Then, in a nitrogen atmosphere, potassium fluoride (0.9 g) is added, a reflux apparatus cooled at 20° C. is installed at the upper portion of the flask, and the mixture is stirred for 36 hours with heating at 150° C. in a state where the outlet of the apparatus is flashed with nitrogen to obtain a reaction crude liquid. The liquid is subjected to pressure filtration by a filter (pore diameter 0.1 μm, made of PTFE), and the solvent in the obtained filtrate is distilled off by an evaporator to obtain a pale yellow compound (10.80 g) which is liquid at 25° C. as a product.

As a result of the analysis of the product by $^1$H-NMR and $^{19}$F-NMR, formation of the following compound (A-11b) wherein —CF$_2$CH$_2$OH groups in the compound (A-11a) are converted to —CF$_2$CH$_2$OCH$_2$CH$_2$OH groups is confirmed. The proportion of the —CF$_2$CH$_2$OCH$_2$CH$_2$OH groups in the product to the —CF$_2$CH$_2$OH groups in the compound (A-11a) used for the reaction is 97.3 mol %, and the product is a mixture of two or more types differing in terminal groups. $M_n$ is 3,050, and $M_w/M_n$ is 1.25. Further, it is confirmed by $^{19}$F-NMR that no —(OCF$_2$O)— structure is present in the compound (A-11b).

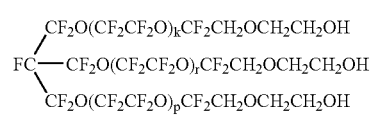

$^1$H-NMR δ (ppm): 4.31, 3.9, 3.76.
$^{19}$F-NMR δ (ppm): −77.0, −88.2 to −90.5, −135.0 to −139.0, −181.5 to −184.5.

Example 7

Examples for 2,3-Epoxy-1-Propanol Addition Reaction to Compound (A-11a) Obtained in Example 5

The compound (A-11a)(10 g) obtained in the same method as in Example 5 and 2-methyl-2-propanol (5.0 g) are put in a round-bottomed flask (250 mL) in a nitrogen atmosphere, followed by stirring until they are uniformly mixed. A reflux tube of which the outlet is flashed with a nitrogen gas at 20° C. is installed at the outlet of the round-bottomed flask.

Then, potassium t-butoxide (0.20 g) is charged into an autoclave and heated at 70° C., followed by stirring for 30 minutes. Further, while the internal temperature is maintained at 70° C., 2,3-epoxy-1-propanol (0.8 g) is dropwise added thereto over a period of 2 hours, followed by stirring for 12 hours. The round-bottomed flask is cooled to 25° C. and flashed with a nitrogen gas, and 0.2 g/L hydrochloric acid (50 mL) is dropped added to obtain a liquid separated into two layers. The organic layer of the liquid is recovered and R-225 (50 mL) is added to obtain a solution, which is washed twice with distillated water (500 mL) and dehydrated by magnesium sulfate, and the solvent is distilled off by an evaporator to obtain a pale yellow compound (10.68 g) which is liquid at 25° C. as a product.

As a result of the analysis of the product by $^1$H-NMR and $^{19}$F-NMR, formation of the following compound (A-12a) wherein —$CF_2CH_2OH$ groups in the compound (A-11b) are converted to —$CF_2CH_2OCH_2CH(OH)CH_2OH$ is confirmed. The proportion of —$CF_2CH_2OCH_2CH(OH)CH_2OH$ in the product to the —$CF_2CH_2OH$ groups in the compound (A-11b) used for the reaction is 92.5 mol %, and the product is a mixture of two or more types differing in terminal groups. The product is confirmed by $^{19}$F-NMR to be a compound having no —$(OCF_2O)$— structure. Further, $M_n$ is 3,060, and $M_w/M_n$ is 1.28.

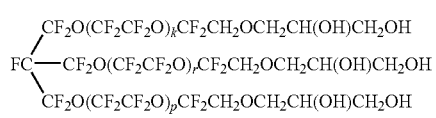

(A-12a)

$^1$H-NMR δ (ppm): 3.45, 3.67, 4.67
$^{19}$F-NMR ε (ppm): −77.1, −88.2. to −90.5, −135.0 to −139.0, −181.5 to −184.5.

Example 8

Examples for Coating with Compound (A-11a)

The compound (A-11a)(1 g) obtained in Example 5 and perfluoro(t-butyl) amine (99 g, IL-263 manufactured by s Tokuyama Corporation) are charged in a glass flask, followed by stirring for 2 hours to obtain a colorless and transparent uniform solution. The solution is applied on an aluminum plate by spin coating at a spinning rate of 700 rpm for 20 seconds, followed by heat treatment at 80° C. for 1 hour to form a uniform and transparent membrane with a thickness of 0.05 μm on the aluminum plate. The coefficient of friction of the aluminum plate surface remarkably decreases.

Example 9

Example for Stability Test of Compound (A-11a)

In a nitrogen atmosphere (100 mL/min), the temperature is raised from 25° C. to 500° C. at a rate of 10° C./min, whereby the mass reduction of the compound (A-11a)(25 mg) obtained in Example 5 is measured by a differential thermobalance. As a result, the mass reduction is not observed until 300° C., and the mass reduction profile is constant, thus showing excellent stability.

Further, also in a case where a stability test of the above identified compound (25 mg) is carried out in the presence of γ-alumina fine particles (0.5 g, N-611N, manufactured by Nikki Chemical Co., Ltd), the mass reduction profile is the same as in the case where no γ-alumina file particles are present, thus showing excellent stability even in the presence of a Lewis acid catalyst.

Example 10

Stability Test of Known Perfluoropolyether (Comparative Example)

Using a perfluoropolyether essentially containing a —$OCF_2O$— structure (FOMBLIN Z DiOL4000, manufactured by Ausimont Inc.), a stability test was carried out in the same manner as in Example 9. As a result, in the presence of γ-alumina fine particles, the ether underwent decomposition in its entire amount at from 240 to 250° C. and evaporated as converted to low molecular weight compounds.

Example 11

Example 11-1

Example for Production and Evaluation of Compound (A-11d)

A compound (A-11d) was obtained by carrying out the same reactions as in reactions in Examples 1, 2-1, 3, 4-1 and 5 except that the compound (D2-1) in Example 1 was changed to a commercial polyoxyethylene glycerol ether (Uniox G1200 manufactured by NOF Corporation). Structures and NMR spectra of compounds obtained in the respective Examples are as follows. It was confirmed that the compound (A-11d) contained no —$(OCF_2O)$— unit. $M_n$ of the compound (A-11d) was 3,000. Further, using the compound (A-11d), the same evaluations as in Examples 8 and 9 were carried out, whereupon the same conclusion as for of the compound (A-11a) was obtained. The compound (A-11d) had $M_n$ of 2,600 and $M_w/M_n$ of 1.14.

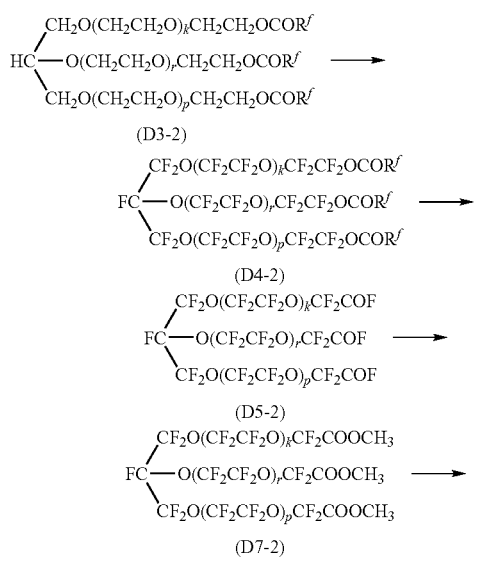

-continued

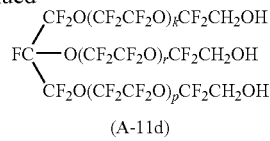

(A-11d)

NMR Spectra of Compound (D3-2)
$^1$H-NMR (solvent: CDCl$_3$) δ (ppm): 3.4 to 3.8, 4.5.
$^{19}$F-NMR (solvent: CDCl$_3$) δ (ppm): −76.0 to −81.0, −81.0 to −82.0, −82.0 to −82.5, −82.5 to −85.0, −128.0 to −129.2, −131.1, −144.7.

NMR Spectra of Compound (D4-2)
$^1$H-NMR δ (ppm): 5.9 to 6.4.
$^{19}$F-NMR δ (ppm): −77.5 to −86.0, −88.2 to −92.0, −120.0 to −139.0, −142.0 to −146.0.

NMR Spectra of Compound (D5-2)
$^1$H-NMR δ (ppm) : 5.9 to 6.4.
$^{19}$F-NMR δ (ppm): 12.7, −78.1, −88.2 to −92.0, −135.0 to −139.0.

NMR Spectra of Compound (D7-2)
$^1$H-NMR δ (ppm): 3.95, 5.9 to 6.4.
$^{19}$F-NMR δ (ppm): −78.3, −88.2 to −92.0, −135.0 to −139.0.

NMR Spectra of Compound (A-11d)
$^1$H-NMR δ (ppm): 3.94.
$^{19}$F-NMR δ (ppm): −80.1, −88.2 to −90.5, −135.0 to −139.0.

Examples 11-2

The following compound (A-11e) was obtained in the same manner as in Example 6 except that the compound (A-11a) in Example 6 was changed to the compound (A-11d) produced in Example 11-1. M$_n$ of the compound (A-11e) was 3,050. M$_w$/M$_n$ was 1.26. It was confirmed by $^{19}$F-NMR that the compound (A-11e) had no —(OCF$_2$O)— structure.

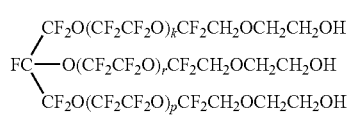

(A-11e)

$^1$H-NMR δ (ppm): 4.31, 3.9, 3.76.
$^{19}$F-NMR δ (ppm): −77.0, −88.2 to −90.5, −135.0 to −139.0.

Example 11-3

The following compound (A-12b) was obtained in the same manner as in Example 7 except that the compound (A-11a) in Example 7 was changed to the compound (A-11d) produced in Example 11-1. M$_n$ of the compound (A-12b) was 3,060. M$_w$/M$_n$ was 1.29.

It was confirmed by $^{19}$F-NMR that the compound (A-12b) had no —(OCF$_2$O)— structure.

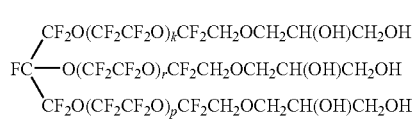

(A-12b)

$^1$H-NMR δ (ppm): 3.45, 3.67, 4.67.
$^{19}$F-NMR δ (ppm): −77.1, −88.2 to −90.5, −135.0 to −139.0.

Example 12

Example 12-1

Example for Production of Compound (A-21a)

A compound (A-21a) was obtained by carrying out the same reactions as in Examples 1, 2-1, 3, 4-1 and 5 except that the compound (D3-1) in Example 1 was changed to the following compound (D3-3). Structures and NMR spectra of compounds obtained in the respective Examples are as follows. It was confirmed that the compound (A-21a) had no —(OCF$_2$O)— unit. M$_n$ of the compound (A-21a) was 26,003, 600. Further, using the compound (A-21a), the same evaluations as in Examples 8 and 9 were carried out, whereupon the same conclusion as for the compound (A-21a) was obtained. M$_w$/M$_n$ of the compound (A-21a) was 1.21.

  (D3-3)

  (D4-3)

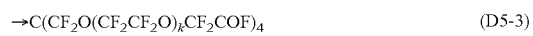  (D5-3)

  (D7-3)

  (A-21a)

NMR Spectra of Compound (D3-3)
$^1$H-NMR (solvent: CDCl$_3$) δ (ppm): 3.4 to 3.8, 4.5.
$^{19}$F-NMR (solvent: CDCl$_3$) δ (ppm): −76.0 to −81.0, −81.0 to −82.0, −82.0 to −82.5, −82.5 to −85.0, −128.0 to −129.2, −131.1, −144.7.

NMR Spectra of Compound (D4-3)
$^1$H-NMR δ (ppm): 5.9 to 6.4.
$^{19}$F-NMR δ (ppm): −65.2 to −68.8, −77.5 to −86.0, −88.2 to −92.0, −120.0 to −139.0, −142.0 to −146.0.

NMR Spectra of Compound (D5-3)
$^1$H-NMR δ (ppm): 5.9 to 6.4.
$^{19}$F-NMR δ (ppm): 12.7, −60.2 to −68.8, −78.1, −88.2 to −92.0, −135.0 to −139.0.

NMR Spectra of Compound (D7-3)
$^1$H-NMR δ (ppm): 3.95, 5.9 to 6.4.
$^{19}$F-NMR δ (ppm): −63.2 to −65.8, −78.3, −88.2 to −92.0, −135.0 to −139.0.

NMR Spectra of Compound (A-21a)
$^1$H-NMR δ (ppm): 3.94.
$^{19}$F-NMR δ (ppm): −64.2 to −65.8, −80.1, −88.2 to −90.5, −135.0 to −139.0

Examples 12-2

The following compound (A-21b) was obtained in the same manner as in Example 6 except that the compound (A-11a) in Example 6 was changed to the compound (A-21a) produced in Example 12-1. M$_n$ of the compound (A-21b) was 2,670. M$_w$/M$_n$ was 1.30.

It was confirmed by $^{19}$F-NMR that the compound (A-21b) had no —(OCF$_2$O)— structure.

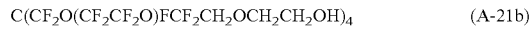  (A-21b)

¹H-NMR δ (ppm): 4.31, 3.9, 3.76.
¹⁹F-NMR δ (ppm): −64.2 to −65.8, −77.0, −88.2 to −90.5, −135.0 to −139.0.

Example 12-3

The following compound (A-22a) was obtained in the same manner as in Example 7 except that the compound (A-11a) in Example 7 was changed to the compound (A-21a) produced in Example 12-1. $M_n$ of the compound (A-22a) was 2,650. $M_w/M_n$ was 1.34.

It was confirmed by ¹⁹F-NMR that the compound (A-22a) had no —(OCF$_2$O)— structure.

C(CF$_2$O(CF$_2$CF$_2$O)$_k$CF$_2$CH$_2$OCH$_2$CH(OH)CH$_2$OH)$_4$  (A-22a)

¹H-NMR δ (ppm): 3.45, 3.67, 4.67.
¹⁹F-NMR δ (ppm): −64.2 to −65.8, −77.1, −88.2 to −90.5, −135.0 to −139.0.

Example 13

Example 13-1

Example for Production and Evaluation of Compound (A-31a)

A compound (A-31a) was obtained by carrying out the same reactions as in Examples 1, 2-1, 3, 4-1 and 5 except that the compound (D3-1) in Example 1 was changed to the following compound (D3-4). Polyoxyethylene glycerol ether (D2-4) as the material of the compound (D3-4) was obtained by adding 2,3-epoxy-1-propanol to a compound (D0-4) obtained by the method disclosed in a Patent Document (PERFECT Basic Patent) by a known method to obtain (D1-4), and further adding ethylene oxide. Structures and NMR spectra of compounds obtained in the respective Examples are as follows. It was confirmed that the compound (A-31a) had no —(OCF$_2$O)— unit. $M_n$ of the compound (A-31a) was 2,900. Further, using the compound (A-11d), the same evaluations as in Examples 8 and 9 were carried out, whereupon the same conclusion as for the compound (A-11a) was obtained. $M_w/M_n$ of the compound (A-31a) was 1.13.

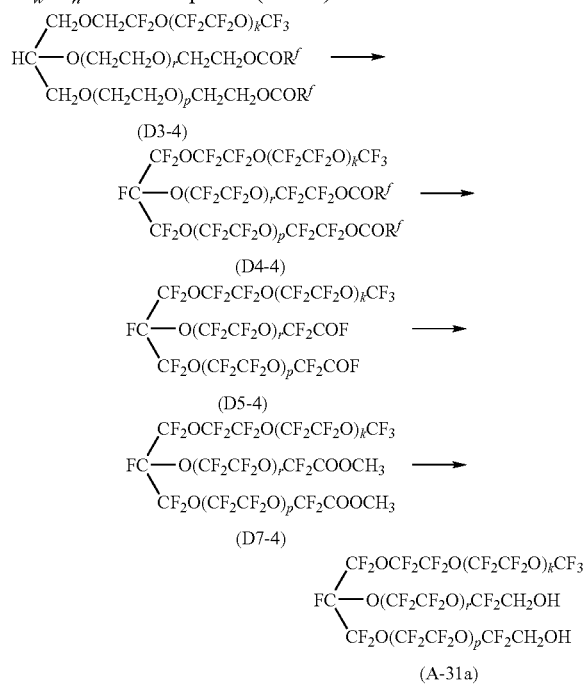

(A-31a)

NMR Spectra of Compound (D3-4-2)
¹H-NMR (solvent: CDCl$_3$) δ (ppm): 3.4 to 3.8, 3.95, 4.5.
¹⁹F-NMR (solvent: CDCl$_3$) δ (ppm): −54.0 to −56.0, −76.0 to −81.0, −81.0 to −82.0, −82.0 to −82.5, −82.5 to −85.0, −87.0 to −92.0, −128.0 to −129.2, −131.1, −144.7.

NMR Spectra of Compound (D4-4-2)
¹H-NMR δ (ppm): 5.9 to 6.4.
¹⁹F-NMR δ (ppm): −54.0 to −56.0, −77.5 to −86.0, −88.2 to −92.0, −120.0 to −139.0, −142.0 to −146.0.

NMR Spectra of Compound (D5-4-2)
¹H-NMR δ (ppm): 5.9 to 6.4.
¹⁹F-NMR δ (ppm): 12.7, −54.0 to −56.0, −78.1, −88.2 to −92.0, −135.0 to −139.0.

NMR Spectra of Compound (D7-4-2)
¹H-NMR δ (ppm): 3.95, 5.9 to 6.4.
¹⁹F-NMR δ (ppm): −54.0 to −56.0, −78.3, −88.2 to −92.0, −135.0 to −139.0.

NMR Spectra of Compound (A-11d)
¹H-NMR δ (ppm): 3.94.
¹⁹F-NMR δ (ppm): −54.0 to −56.0, −80.1, −88.2 to −90.5.

Examples 13-2

The following compound (A-31b) was obtained in the same manner as in Example 6 except that the compound (A-11a) in Example 6 was changed to the compound (A-31a) produced in Example 13-1. $M_n$ of the compound (A-31b) was 2,950. $M_w/M_n$ was 1.19.

It was confirmed by ¹⁹F-NMR that the compound (A-31b) had no —(OCF$_2$O)— structure.

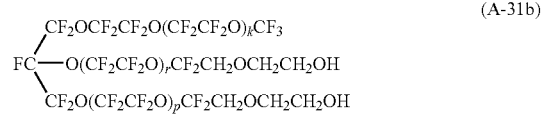

(A-31b)

¹H-NMR δ (ppm): 4.31, 3.9, 3.76.
¹⁹F-NMR δ (ppm): −54.0 to −56.0, −77.0, −88.2 to −90.5, −135.0 to −139.0.

Examples 11-3

The following compound (A-32a) was obtained in the same manner as in Example 7 except that the compound (A-11a) in Example 7 was changed to the compound (A-31a) produced in Example 13-1. $M_n$ of the compound (A-32a) was 2,960. $M_w/M_n$ was 1.21.

It was confirmed by ¹⁹F-NMR that the compound (A-32a) had no —(OCF$_2$O)— structure.

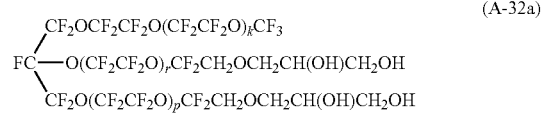

(A-32a)

¹H-NMR δ (ppm): 3.45, 3.67, 4.67.
¹⁹F-NMR δ (ppm): −54.0 to −56.0, −77.1, −88.2 to −90.5, −135.0 to −139.0.

INDUSTRIAL APPLICABILITY

The present invention provides a novel fluoropolyether compound useful as e.g. a lubricant, a surface modifier or a surfactant. The fluoropolyether compound of the present invention has a low vapor pressure and low viscosity, has high chemical stability and is less problematic in deterioration during its use. Further, the fluoropolyether compound of the present invention is a compound excellent in self-replenishing property and is thereby useful for the above application.

The entire disclosure of Japanese Patent Application No. 2004-5586 filed on Jan. 13, 2004 including specification, claims and summary is incorporated herein by reference in its entirety.

What is claimed is:

1. A fluoropolyether compound of the following formula (A):

$$(X-)_x Y(-Z)_z \quad (A)$$

wherein
X is a group of formula (X)

$$HO-(CH_2CH_2O)_a-(CH_2CH(OH)CH_2O)_b-(CH_2)_c-CF_2O(CF_2CF_2O)_d- \quad (X)$$

wherein
a is an integer of from 0 to 100,
b is an integer of from 0 to 100,
c is an integer of from 1 to 100, and
d is an integer of from 1 to 200;
Z is a group of formula (Z):

$$R^F O(CF_2CF_2O)_g- \quad (Z)$$

wherein
$R^F$ is a $C_{1-20}$ perfluoroalkyl group or a group having an etheric oxygen atom inserted between carbon-carbon atoms of such a perfluoroalkyl group with the proviso that the group has no —OCF$_2$O— structure, and
g is an integer of from 3 to 200,
Y is a (x+z) valent perfluorinated saturated hydrocarbon group, or a (x+z) valent perfluorinated saturated hydrocarbon group having an etheric oxygen atom inserted between carbon-carbon atoms, having no —OCF$_2$O— structure;
wherein
x is an integer of at least 2,
z is an integer of at least 0, and
(x+z) is an integer of from 3 to 20, provided that when x is at least 2, groups represented by the formula (X) may be the same or different, and when z is at least 2, groups represented by the formula (Z) may be the same or different.

2. The compound according to claim 1, wherein (X) is any group selected from the group consisting of $$HOCH_2CF_2O(CF_2CF_2O)_d- \quad (X-1)$$

$$HOCH_2CH(OH)CH_2OCH_2CF_2O(CF_2CF_2O)_d- \quad (X-2)$$

$$HOCH_2CH_2CF_2O(CF_2CF_2O)_d- \quad (X-3)$$

$$HOCH_2CH_2OCH_2CF_2O(CF_2CF_2O)_d- \quad (X-4)$$

wherein
d is an integer of from 1 to 200.

3. The compound according to claim 2, wherein the compound of formula (A) is a compound of formula (A-1) or (A-2):

$$(X^{10}-)_3 Y^3 \quad (A-1)$$

$$(X^{10}-)_4 Y^4 \quad (A-2)$$

wherein
$X^{10}$ is any group selected from the groups consisting of (X-1) to (X-4),
$Y^3$ is a trivalent perfluoroalkyl group, and
$Y^4$ is a tetravalent perfluoroalkyl group.

4. The compound according to claim 2, wherein the compound of formula (A) is a compound of formula (A-3):

$$(X^{10}-)_2 Y^3 -Z \quad (A-3)$$

wherein
$X^{10}$ is any group selected from the group consisting of (X-1) to (X-4), and
$Y^3$ is a trivalent perfluoroalkyl group.

5. The fluoropolyether compound according to claim 1, wherein the compound of formula (A) has a molecular weight of from 500 to 1,000,000 as measured by gel permeation chromatography and has a molecular weight distribution of from 1.0 to 1.5.

6. A solution composition, comprising:
the fluoropolyether compound as defined in claim 1; and
an organic solvent.

7. The solution composition according to claim 6, wherein a concentration of the fluoropolyether compound is from 0.01 to 50 mass %.

8. A lubricant, a surface modifier or a surfactant, comprising the fluoropolyether compound as defined in claim 1.

9. The compound according to claim 3, wherein the compound of formula (A) is a compound according to formula (A-1), wherein
$Y^3$ is —CF$_2$—CF—CF$_2$— or CF(CF$_2$—)$_3$.

10. The compound according to claim 3, wherein the compound of formula (A) is a compound according to formula (A-2), wherein
$Y^4$ is C(CF$_2$—)$_4$.

11. The compound according to claim 4, wherein
$Y^3$ is —CF$_2$—CF—CF$_2$— or CF(CF$_2$—)$_3$.

12. The solution composition according to claim 6, wherein the solvent is a perfluoroamine or a perfluoroalkane.

* * * * *